United States Patent [19]

Stanley

[11] Patent Number: 4,812,696
[45] Date of Patent: Mar. 14, 1989

[54] MOTOR CORE WITH WINDING SLOTS HAVING REDUCED AIR GAPS

[76] Inventor: Louis Stanley, Taglieberstrasse, 1230 Vienna 23, Austria

[21] Appl. No.: 15,628

[22] Filed: Feb. 17, 1987

[51] Int. Cl.$^4$ .......................... H02K 15/02; H02K 3/48
[52] U.S. Cl. ........................ 310/216; 29/596; 29/598; 29/605; 29/606; 310/42; 310/268
[58] Field of Search ................. 29/596, 598, 609, 606, 29/605; 310/193, 216, 217, 259, 268, 153, 154, 155, 156

[56] References Cited

U.S. PATENT DOCUMENTS

| | | | |
|---|---|---|---|
| 3,581,132 | 5/1971 | Laing | 310/193 X |
| 3,802,066 | 4/1974 | Barrett | 29/596 |
| 4,064,410 | 12/1977 | Roach | 310/211 |
| 4,267,719 | 5/1981 | Walker | 29/596 X |
| 4,507,947 | 4/1985 | Stanley | 29/596 X |

*Primary Examiner*—Carl E. Hall
*Attorney, Agent, or Firm*—Dennison, Meserole, Pollack & Scheiner

[57] ABSTRACT

A magnet core for a rotor or stator of an electrical machine, e.g. a motor, generator or transformer, comprises a helically wound coil of electric strip having transverse slits extending from one edge across part of its width and being separated by tongues or teeth such that the slits in successive turns of the coil cooperate to define slots extending generally radially of the coil to receive electrical windings. Electrical windings are housed in the slots, and the tongues are bent radially inwards towards the coil axis so as to close the slots at their upper ends to leave substantially no air gap.

5 Claims, 7 Drawing Sheets

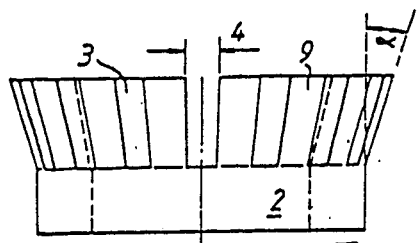
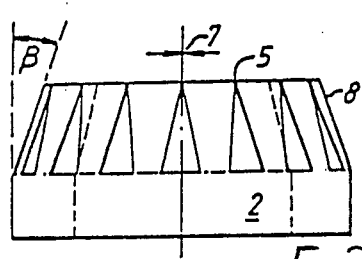
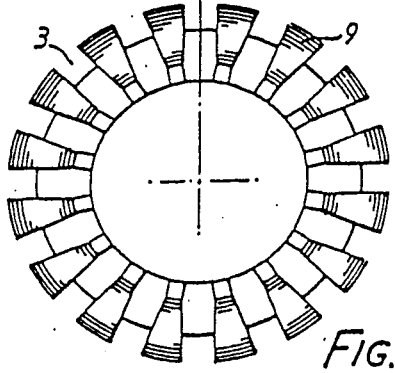
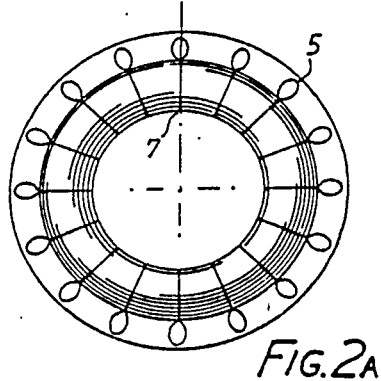
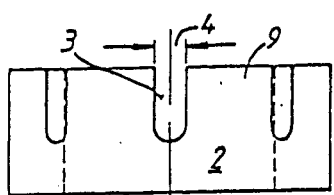
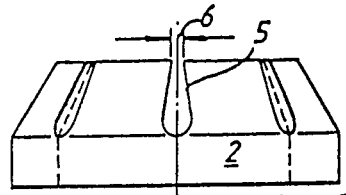
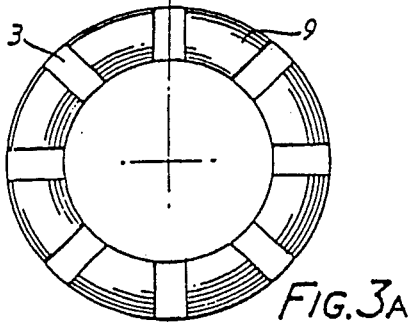
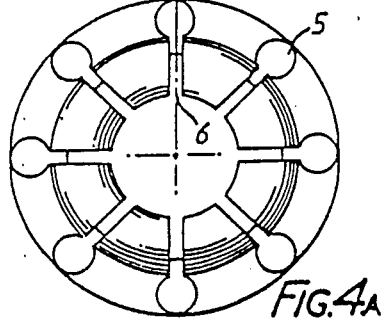

MOTOR CORE WITH WINDING SLOTS HAVING REDUCED AIR GAPS

TECHNICAL FIELD OF THE INVENTION

This invention relates to electrical machines, both rotary machines such as electric motors and generators and stationary machines such as transformers, and more particularly to wound cores for such machines and to methods and apparatus for manufacturing such cores.

BACKGROUND OF THE INVENTION

In the manufacture of electrical machines such as motors, generators and transformers, cores such as rotor cores, stator cores and transformer cores are stamped from metal sheet (electrical or dynamo sheet) and then stacked and pressed together into a package. The round shape of the individual stampings leads to the formation of a large proportion of scrap. Moreover such packages of sheet stampings must be pressed firmly together in order to avoid energy losses and a frequency-dependent humming. For this purpose cast pressure plates are generally needed at the ends of the package, the whole assembly being held together by means of bolts or similar fasteners passing through appropriate holes in the stampings and end plates. All this involves considerable expenditure of manufacturing effort and the use of additional prefabricated parts, in addition to the waste of material already mentioned.

It has also been proposed to form cores for axial flux motors by coiling strip having openings therein to accommodate the field windings, the width of these openings being restricted at the top to 2 mm or less in order to minimise the air gap. It is important to form the punched-out openings so that in the wound coil they are so positioned as to form a slot or passage extending radially of the core. Since the field windings have to be inserted through the narrow gap at the top of the opening it is not possible to employ a simple winding machine, and the field windings are generally wound manually, which is both inaccurate and time-consuming, and therefore costly.

OBJECT OF THE INVENTION

The object of the invention is to reduce the wastage of material and the manufacture effort to a minimum and to eliminate additional elements that are not essential for the functioning of the machine.

A further object is to provide a highly efficient electrical machine that is characterised by simple design and low production costs, including marked savings in iron for the core and in copper wire for the windings, that can produce a high torque and low slip, and to provide a process and apparatus for manufacturing such a machine.

SUMMARY OF THE INVENTION

According to the invention a magnet core for an electrical machine comprises a helically wound coil of electrical strip, said strip having transverse slits extending from a first edge across part of its width and being separated by tongues such that slits in successive turns of the coil cooperate to define slots extending generally radially of the coil to receive electrical windings, electrical windings being housed in said slots and said tongues being bent inwardly towards the coil axis so as to close the slots at their upper ends to leave substantially no air gap.

To prevent the coil from unwinding, lugs are advantageously formed in successive turns of the strip at the beginning and the end of the coil so as to interengage.

The spaces remaining in the slots, particularly in the case of a rotor for a squirrel-cage motor, may be filled by casting with metal, advantageously with aluminum or an aluminum alloy.

A process for manufacturing such cores comprises the steps of feeding a strip of electrical or dynamo sheet form a roll; straightening it; cutting away over a predetermined length part of the width of the strip to the depth of the slits and tongues; punching out lugs at the leading end of the strip and after a distance corresponding to one turn of the coil; punching out an opening to receive the lugs after a distance corresponding to a further turn; punching out from the full-width portion of the strip successive transverse slits extending from one edge and spaced apart by tongues of progressively increasing width, so that on continued winding of the strip into a coil the slits cooperate to form slots of substantially uniform width extending generally radially across the coil to receive field windings; forming a further narrower length of the strip; forming cooperating lugs spaced apart by one turn of the strip about one turn from the end of the strip and near the end of the strip; separating the wound portion of the strip from the supply roll; inserting and insulating the field windings; and ending the tongues radially inwards of the coil so as to close the slots at their upper ends, leaving substantially no air gap.

It will be appreciated that when a core is made in this way and the air gaps are closed by bending the tongues inwards, the tops of the slits and the corresponding slots can initially be left open for the insertion of preformed field windings. If desired, the space for the insertion of the windings may be further widened by bending the tongues radially outwards before the insertion step.

Insulation may be inserted in the slots both before and after the windings are inserted.

Apparatus for manufacturing the cores can comprise means for feeding the strip from a supply roll to a punching and coil-winding station and transfer means for transferring the wound core to further successive operating stations, including a station having means for inserting field windings in slots in the coils and a slot-casing station with means for closing the air-gaps in the slots, the punching and winding station comprising a cutting for reducing the width of the strip, first punching means for punching out lugs and corresponding window openings in the strip, second punching means for punching transverse slits in the strip to receive the field windings and means for winding the strip into a coil, the slit-punching means and winding means being operated by a common drive and being connected through an indexing mechanism so as to form slits at a predetermined angular spacing around the coil and the slot-closing means comprising a press for bending the tongues separating the slots inwardly of the coil. The transfer means is arranged to transport the cores automatically between the successive operating stations.

BRIEF DESCRIPTION OF THE DRAWINGS

The invention will now be described in more detail with reference to the accompanying drawings, in which:

FIG. 1 is a side view of a rotor or stator core with open slots and the tongues bent outwardly;

FIG. 1A is a plan view of the rotor or stator of FIG. 1;

FIG. 2 is a side view of a rotor or stator core with the slots closed (omitting the windings);

FIG. 2A is a plan view of a rotor or stator of FIG. 2;

FIG. 3 is a corresponding view to FIGS. 1 and 2 showing another form of core;

FIG. 3A is a plan view basically corresponding to FIGS. 1A and 2A showing the other form of cores as in FIG. 3;

FIG. 4 is a corresponding side view of yet another form of core similar to FIGS. 1, 2 and 3;

FIG. 4A is a plan view of the core of FIG. 4;

DETAILED DESCRIPTION OF THE PREFERRED EMBODIMENTS OF THE INVENTION

Figure 5:
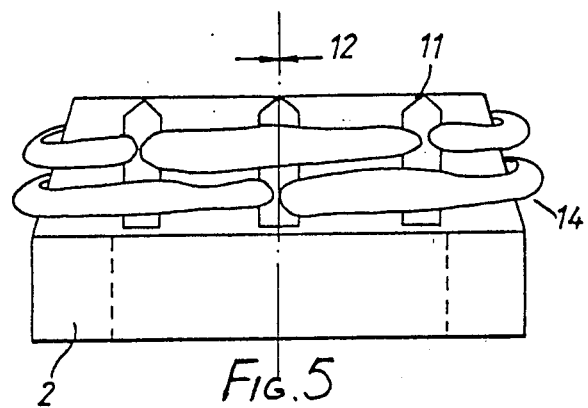
FIG. 5 is a side view of a complete closed core with windings inserted.
Figure 5A:
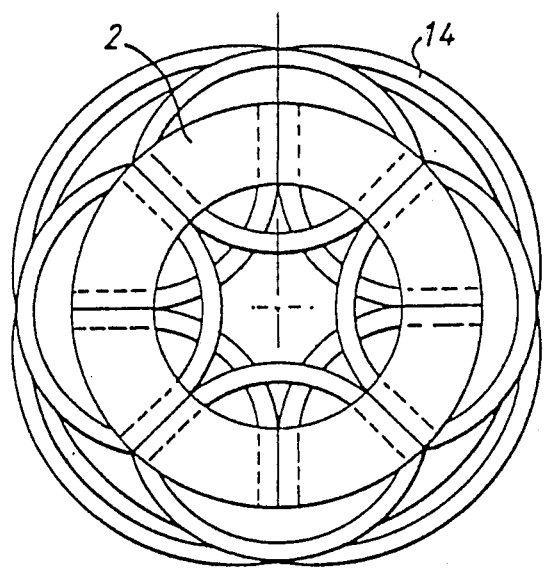
FIG. 5A is a plan view of the core of FIG. 5.

The form of cores according to the invention is shown in FIGS. 1 to 5. FIG. 1 shows a core 2 for a stator or rotor of an axial flux motor, consisting of a punched-out and wound metal strip formed with a ring of open slots 3, bounded by tongues 9 and ending in open air-gaps 4, to receive field windings adapted to fill the slots as fully as possible. The insertion of the windings is facilitated in the case of this embodiment by bending the tongues 9 outwards by an angle $\alpha$, whereby the slots 3 are made wider at the top. After inserting the winding the tongues are bent inwards, as shown in FIG. 2, to an angle $\beta$ to the core axis, thus substantially closing the air-gaps as shown at 7 and forming substantially closed spaces 8 for the windings. To assist in the closure, the slits in the strip that form the slots 3 may be narrowed at their upper ends. The winding spaces 8 can, for example in case of squirrel-cage motors, be subsequently filled with aluminum by casting.

FIG. 3 shows a modification of the core 2 in which the tongues 9 are not bent outwards. In this embodiment the narrowing of the slits in the region of the air-gaps may be omitted in order to facilitate the insertion of the windings. In this case also the slots are closed by bending the tongues inwards after insertion of the windings. This is shown in FIG. 4, where the air gaps 6 of the slots 5 are substantially closed.

FIG. 5 shows a finished core 2 of a stator with field windings inserted in the slots 11 and the air gaps 12 closed by bending the tongues inwards. Closing the air gaps 12 is important for the efficiency of the machine and to reduce slip.

Figure 6:
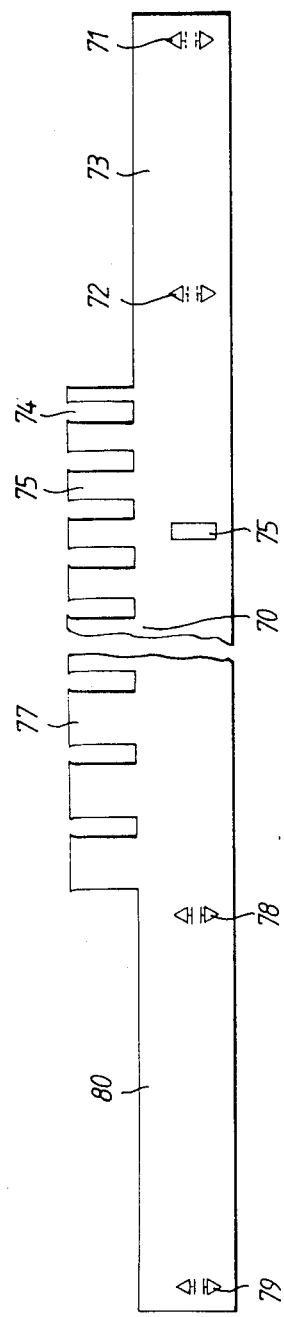
FIG. 6 shows the leading and rear ends of a punched strip.

In order to obtain radial slots on winding strip on a mandrel it is necessary to dispose the slits as shown in FIG. 6, which shows a shaped and flattened strip 70. Along the major part of its length transverse slits 74 are formed running inwards from one edge and separated by tongues or teeth 75, 77. The slits are all of the same width, but the width of the tongues or teeth between the slits increases progressively from the leading end 73 towards the rear end 80 of the strip so that the slits come at the same angular position in each turn of the coil as its diameter increases, and thus cooperate to form the desired radial slots. To avoid problems in starting the winding automatically, and to facilitate finishing, the strip is cut away from one edge over a predetermined length at the leading and rear ends to the depth of the slits.

A lug 71 pressed out at the leading end of the strip serves to engage with a pin on the winding mandrel, and a second lug 72 is formed at a distance corresponding to one turn of the coil so that it is pressed together with the first lug and engages therewith as the mandrel rotates. To ensure that the coil is smooth, a window 76 is made in the strip at a distance corresponding to a one more turn of the coil, to accommodate the lugs 71 and 72. At the rear end of the strip a pair of corresponding lugs 78 and 79 are again provided to hold the core coil in shape. The lugs 71, 72, 78, 79 and the window opening 76 can all be punched out by the same punch.

Figure 7:
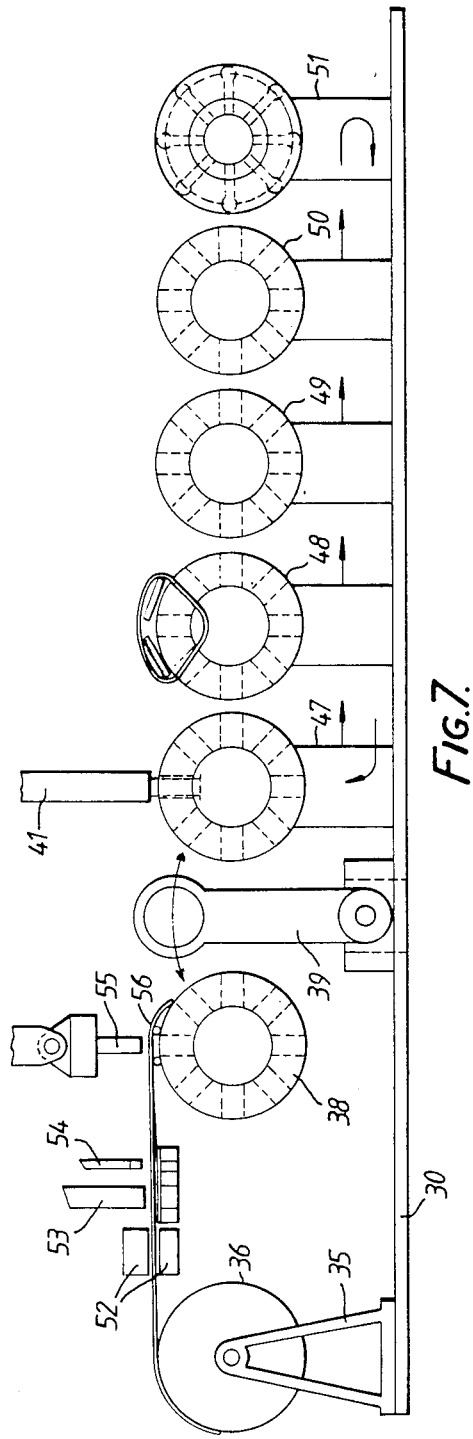
FIGS. 7 and 8 are respectively side and plan views of a complete installation for making cores according to the invention.

In order to shape the strip, it is fed, as shown diagrammatically in FIG. 7, from a supply roll 36 through a straightening device 52 past a width-reducing cutter 53 and a lug punch and die 54 to the punch and die 55, 56 for forming the slits.

Figure 9:
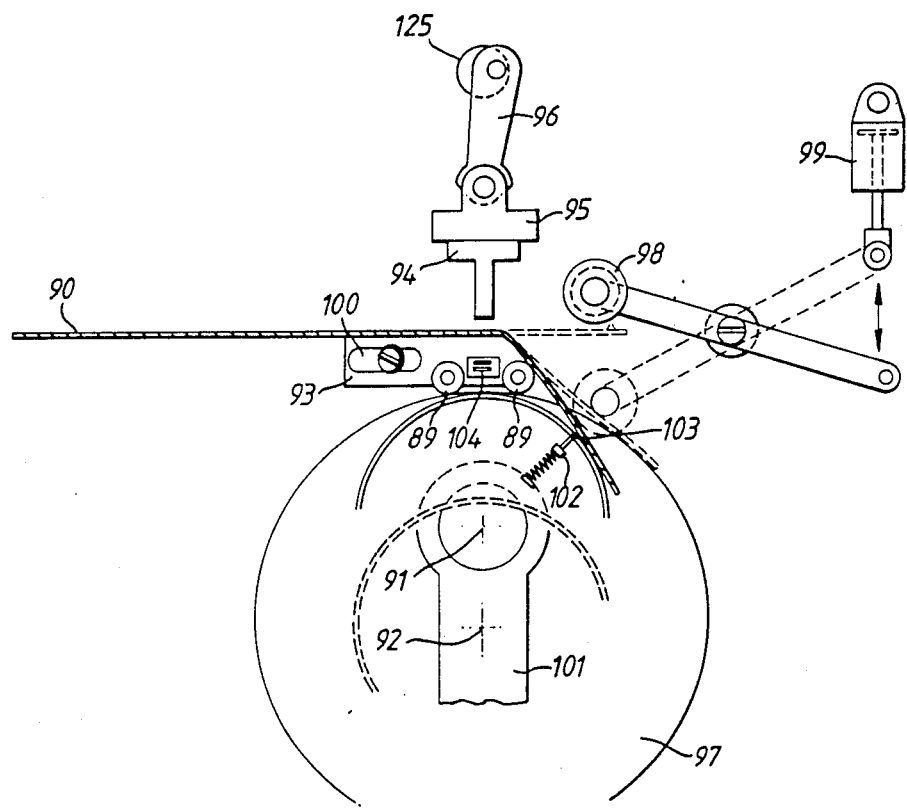
FIG. 9 shows the arrangement for punching and winding the strip.

The means for punching the slits and winding the coil is shown in more detail in FIG. 9, which also shows the mechanism for engaging the strip for starting the winding automatically.

The strip 90 passes over a stationary die 93, and beneath the punch 94. The die 93 is mounted on rollers 89 that bear initially on a mandrel 103 and then on the outside of the coil as it builds up, and can be adjusted tangentially of the coil by means of a slot 100. By means of this adjustment the alignment of slits in successive turns can be adjusted so that the slots in the core can be either exactly radial or oblique, as required. The punch is operated through a ram 95 and a connecting rod 96 mounted eccentrically on a main drive shaft 125. A scrap receiver 104 is located beneath the die, and counter-pressure on the die is applied by the piston rod 101.

After punching, the strip is wound on to the mandrel 103, which is mounted to rotate in a sliding plate 112 and can move downwards as the diameter of the coil increases.

On starting up, engagement of the strip is effected with the axis of the mandrel at the level 91. The leading end of the strip passes under a roller 98 carried on a linkage operated by a piston and cylinder device 99, where it is bent towards the mandrel and held by engagement of the first lug with a pin 102 projecting from the mandrel. The piston 99 then returns the roller 98 to its starting position. Coiling then continues until the mandrel axis reaches the level 92, where the coil 97 is complete and ready for removal from the mandrel, which is constructed to allow this to be done.

Figure 10:
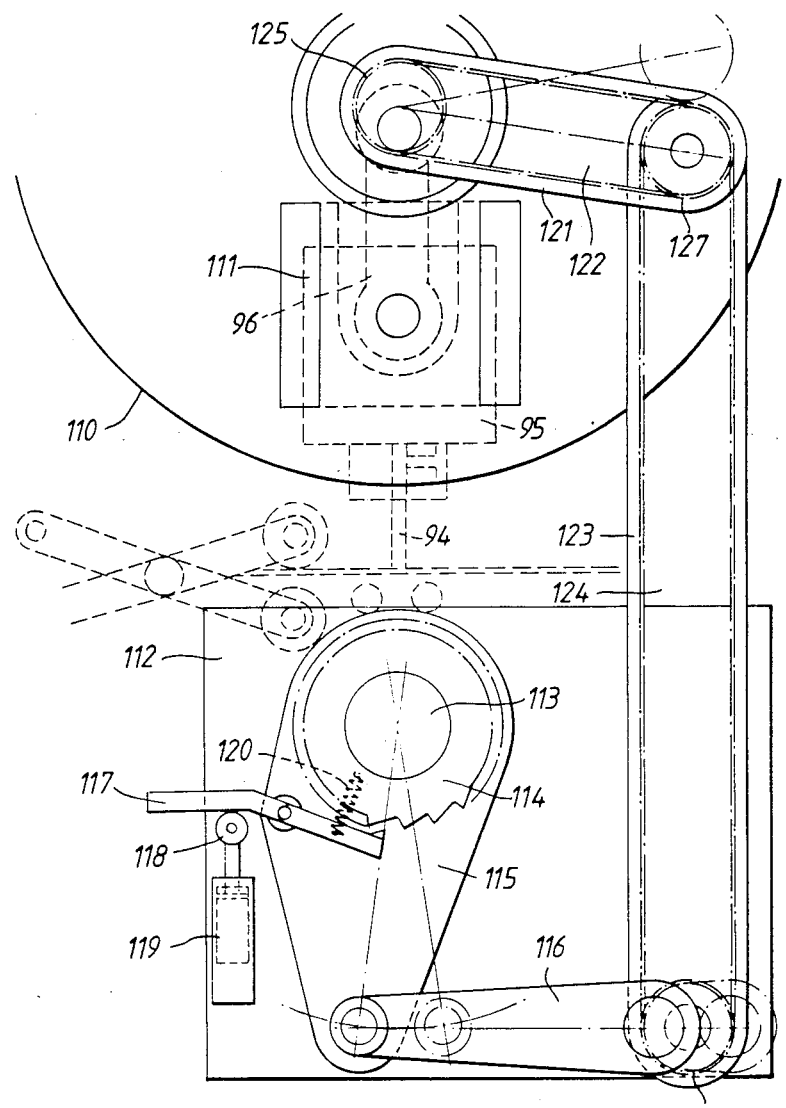
FIG. 10 shows the indexing mechanism.

To ensure the desired alignment of the slits in successive turns of the coil, the slit punching and coil winding mechanisms have a common drive and are linked through an indexing mechanism. A rear view of this mechanism is shown in FIG. 10.

A main drive shaft 125, driven by a motor 32 via a transmission 31 (FIG. 8), carries a flywheel 110 and is connected through an eccentric to a connecting rod 96 that reciprocates the ram 95 of the punch 94 in slides 111.

A plate 122 is pivotably mounted on the main shaft and is linked to a second plate 124, which is pivoted at its other end in the sliding plate 112 carrying the winding mandrel. A chain or toothed drive belt 121 transmits the rotation of the main shaft to a pair of wheels 127 mounted on a pivot pin linking the plates 122, 124 and thence, via a second chain or belt 123, to a wheel 126 mounted on the pivot linking the plate 124 to the sliding plate 112. The wheel 126 is connected by an eccentric to a connecting arm 116 actuating an indexing plate 115 carrying a pawl 117 that is held in engagement with an indexing escapement wheel 114 by a spring 120. Reciprocation of the arm 116 rocks the plate 115 and thus causes the indexing wheel 114, and with it the mandrel 113, to rotate stepwise by constant angular displacement corresponding to the spacing of the teeth on the indexing wheel. This determines the movement of the strip past the punch 94 and thus the spacing of the slits punched in the strip. The angular spacing of the slots in the coil can thus be changed by substituting indexing wheels having different numbers of teeth.

This form of linkage allows constant indexing to be maintained as the mandrel travels with the sliding plate away from the punch 94 as the diameter of the coil increases as the winding progresses.

The pawl 117 can be disengaged from the indexing wheel 114 by means of a piston and cylinder device 119 actuating the level arm carrying the pawl through the roller 118. This allows the mandrel to be rotated independently of the punch 94 at the start and finish of the coil winding.

After insertion of the field windings and insulation, the core is ready for closure.

Figure 11:
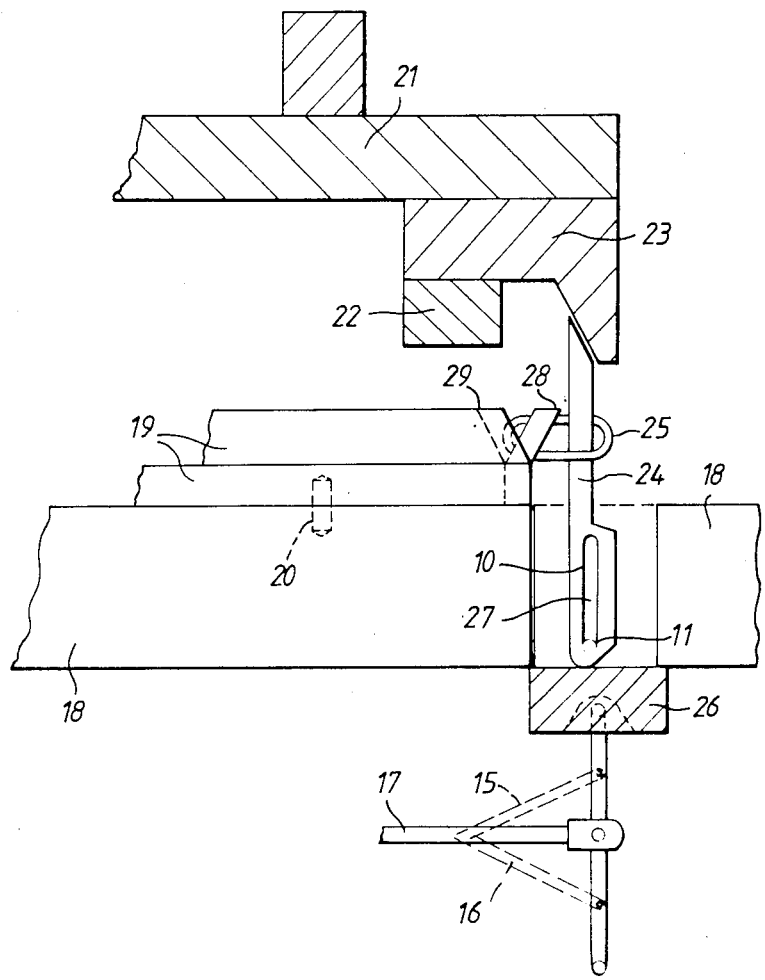
FIG. 11 shows the press for closing the slots in a core.

A press for closing the slots in the core is shown diagrammatically in FIG. 11. In this press the core 19 is supported on a base plate 18, located by pins 20. A press bolster 21 carrying a cam plate 23 and a bottoming plate 22 is mounted facing the open slots of the core and can be moved towards the core. With the press in its open position closing fingers 24 arranged round the base plate and the core are inserted between the field coils 25 and the outer edge of the core by raising the platform 26 on which they are supported.

As the press is closed the cam plate 23 comes into contact with the upper ends of the initially upright closing fingers and causes them to pivot inwardly, about the axis 11, until the bottoming plate 22 reaches the core and ends the movement of the bolster 21. As a result of the inward movement of the closing fingers the tongues between the slots in the core are bent radially inwards as shown at 28 and 29 until they substantially close the gaps 3 at the top of the stator. The width of the gaps depends on the angle $\beta$, and is important for the efficiency and desirable low slip in the machine.

The platform 26 is then lowered by the system of linkages 15, 16, 17, actuated by a piston and cylinder device (not shown), so that the closing fingers emerge again from the windings and return to their starting position, guided by the pivots 11 in their guide slots 10.

Figure 8:
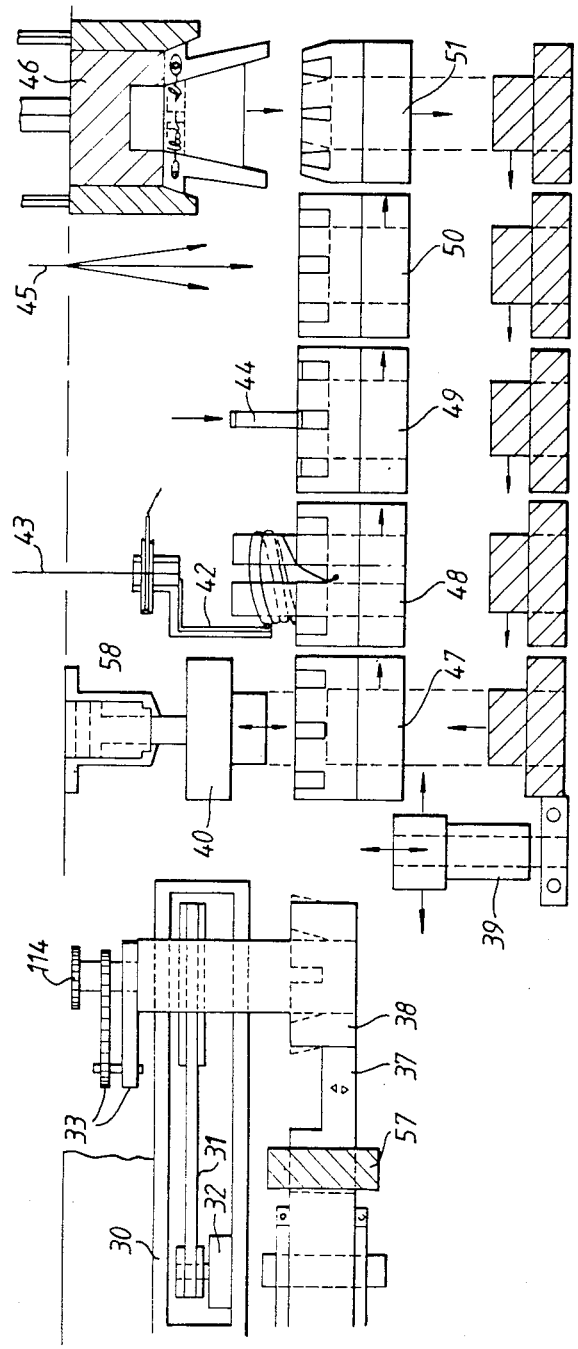

A complete machine for making cores by winding from strip in accordance with the invention is shown diagrammatically in FIGS. 7 and 8. In this machine the punching and winding devices are mounted on a frame 30 and arranged to receive strip from a supply roll 36 supported on a stand 35. As already explained, the strip passes first through a straightening device 52 and thence to a cutter 53 and a first lug punch 54 and a second punching device 55, 56 for forming the slits, and is then wound into a coil 38. A transfer arm 39 conveys the finished coil 38 to a first operating station 47 where it is received by a second transfer arm 40, operated by a piston and cylinder device 58, and loaded onto a conveyor. At the station 47 insulation 41 is inserted in the slots, and the coil is then conveyed to a second station 48 to receive field windings formed by a winding head 42 from wire 43. The core is then conveyed to a second insulating station, where insulation 44 for the air gap is inserted, and finally via an (optional) holding station 50 to the slot-closing station 51 in which the core is closed by the automatic closing press 46. At this stage the core is removed from the conveyor, which in practice is then again adjacent the first station. This cycle is automatically repeated so long as the machine is in operation.

The complete machine may be fully automatic, with its operation electronically programme controlled.

I claim:

1. A magnet core for an electrical machine comprising a helically wound coil of electric strip having a coil axis, said strip having transverse slits extending from a first edge across part of its width and being separated by tongues such that the slits in successive turns of the coil co-operate to define slots extending generally radially of the coil to receive electrical windings, electrical windings being housed in said slots and said tongues being bent inwardly towards the coil axis so as to close the slots at their upper ends to leave substantially no air gap.

2. A magnet core according to claim 1 wherein, at the beginning and end of the coil, lugs formed in successive turns of the strip interengage to prevent the coil from unwinding.

3. A magnet core according to claim 1, wherein spaces remaining in the slots are filled with a cast mass of metal.

4. An electrical machine having a stator or rotor core according to claim 1.

5. A magnet core according to claim 1 wherein the slits in the strip are narrowed at their upper ends.

* * * * *